(12) United States Patent
Tanaka et al.

(10) Patent No.: US 6,768,283 B2
(45) Date of Patent: Jul. 27, 2004

(54) ELECTRIC POWER STEERING CONTROL DEVICE

(75) Inventors: Hideyuki Tanaka, Tokyo (JP);
Masahiko Kurishige, Tokyo (JP);
Noriyuki Inoue, Tokyo (JP);
Kazumichi Tsutsumi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/233,775

(22) Filed: Sep. 4, 2002

(65) Prior Publication Data

US 2003/0052639 A1 Mar. 20, 2003

(30) Foreign Application Priority Data

Sep. 4, 2001 (JP) ........................................ 2001-267333

(51) Int. Cl.[7] .................... G05D 17/00; G05D 17/02; B62D 5/04; B62D 7/09; B62D 7/15
(52) U.S. Cl. .................... 318/632; 318/433; 180/421; 180/443; 180/446; 701/41
(58) Field of Search ................. 318/632, 432, 318/434, 433; 701/41–43; 180/412, 413, 421, 422, 443, 446

(56) References Cited

U.S. PATENT DOCUMENTS

| 5,040,629 | A | * | 8/1991 | Matsuoka et al. | .......... 180/446 |
| 5,732,373 | A | * | 3/1998 | Endo | ............. 701/42 |
| 6,046,560 | A | * | 4/2000 | Lu et al. | ............. 318/432 |
| 6,246,197 | B1 | * | 6/2001 | Kurishige et al. | .......... 318/432 |
| 6,360,151 | B1 | * | 3/2002 | Suzuki et al. | ............. 701/41 |
| 6,445,987 | B1 | * | 9/2002 | Kurishige et al. | ............. 701/41 |
| 6,450,287 | B1 | * | 9/2002 | Kurishige et al. | .......... 180/446 |
| 6,496,762 | B2 | * | 12/2002 | Kurishige et al. | ............. 701/41 |
| 6,527,079 | B2 | * | 3/2003 | Takeuchi et al. | ............. 180/443 |
| 2002/0033300 | A1 | * | 3/2002 | Takeuchi et al. | ............. 180/446 |

FOREIGN PATENT DOCUMENTS

| JP | 11-139339 | | 5/1999 | |
| JP | 2003127888 A | * | 5/2003 | ........... B62D/06/00 |

OTHER PUBLICATIONS

U.S. patent application Ser. No. 09/604,289, Nishiyama et al., filed Jun. 26, 2000.
U.S. patent application Ser. No. 09/781,552, Kurishige et al., filed Feb. 13, 2001.
U.S. patent application Ser. No. 10/045,019, Kurishige et al., Jan. 15, 2002.

* cited by examiner

*Primary Examiner*—Shih-Yung Hsieh
*Assistant Examiner*—Edgardo San Martin
(74) *Attorney, Agent, or Firm*—Leydig, Voit & Mayer, Ltd.

(57) ABSTRACT

An electric power steering control device is provided, which comprises a vehicle speed detector, a steering torque detector, a steering shaft reaction torque meter, a motor speed detector, a motor acceleration detector, a steering torque detector for calculating a base target current, a damping compensator for finding a gain of a damping torque based on a steering shaft reaction torque to calculate a damping compensation amount based on the damping torque gain and motor speed, an inertia compensator for finding a gain of an inertia compensation torque based on the steering shaft reaction torque to calculate an inertia compensation amount based on the inertia compensation torque gain and motor acceleration, and an adder for compensating a base target current by a damping compensation amount and an inertia compensation amount to calculate a target current.

15 Claims, 18 Drawing Sheets

RELATIONSHIP BETWEEN STEERING SHAFT
REACTION TORQUE AND DAMPING F/B GAIN

ELECTRIC POWER STEERING CONTROL DEVICE

BACKGROUND OF THE INVENTION

1. Field of the Invention

The present invention relates to an electric power steering control device and, in particular, to an electric power steering control device for controlling an electric power steering mounted on an automobile or the like.

2. Description of the Related Art

An electric power steering is widely used in recent years because of advantages such as improvement of stability during a hand-free operation and lightness of steering secured during an operation of a steering wheel. As indicated by an example shown in FIG. 20, an electric power steering is a device for detecting a steering torque and using assist map control to supplement a steering torque of a driver by an electric motor in accordance with a predetermined target assist torque. Assist map control is a control system for using a steering torque of a driver as an input to supplement a necessary torque according to a magnitude of the steering torque. As a conventional electric power steering, there is one constituted by a damping compensator mainly for securing stability during a hand-free operation and an inertia compensator mainly for preventing steering from becoming heavy affected by inertia at the time of swift steering to secure lightness of steering. Damping compensation is a control for using a speed of a motor as an input to supplement a steering torque of an operator according to a magnitude of a motor speed and has an effect of stabilizing a vehicle. In addition, inertia compensation is a control for using an acceleration of a motor as an input to supplement a torque equivalent to inertia imposed on an operator in starting to turn a steering wheel or turning the steering wheel in the other direction and has an effect of compensating heavy steering even at the time of swift steering and always securing lightness of steering.

A conventional control device for controlling an electric power steering of this type is proposed, for example, in JP 11-139339 A. In this conventional control device, a steering torque of an operator is supplemented based on a vehicle speed signal value and a measured or estimated motor speed value and motor acceleration value.

In the conventional control device, since an amount of control based on a motor speed and a motor acceleration is kept constant, steering may become heavier than needed if the operator steers fast. In addition, a damping gain and an inertia compensation gain are constant. Thus, in order to increase an amount of damping compensation, since it becomes a resistance (steering shaft reaction) when the operator steers fast, it is necessary to change an assist map.

As described above, in the conventional control device, since an amount of control based on a motor speed and a motor acceleration is kept constant, steering becomes heavier than needed if an operator steers fast.

In addition, as described above, in the conventional control device, a damping gain and an inertia compensation gain are constant. Thus, in order to increase an amount of damping compensation, since it become a resistance when the operator steers fast, it is necessary to change an assist map for compensation of damping.

SUMMARY OF THE INVENTION

The present invention has been devised to solve the above-mentioned problems, and it is an object of the present invention to provide an electric power steering control device that prevents steering from becoming heavier than needed even if a steering wheel is steered fast and makes it unnecessary to change an assist map.

The electric power steering control device of the present invention for controlling the electric power steering, comprises: the vehicle speed detecting means for detecting a vehicle speed; the steering torque detecting means for detecting a steering torque of the steering wheel; the steering shaft reaction torque outputting means for finding and outputting a steering shaft reaction torque; the motor speed detecting means for detecting a motor speed; the base target current calculating means for calculating a base target current for driving the motor based on the vehicle speed and the steering torque; the damping gain calculating means for finding a gain of a damping torque based on the steering shaft reaction torque; the damping compensation amount calculating means for calculating a damping compensation amount based on the gain of the damping torque and the motor speed; and the compensating means for compensating the base target current by the damping compensation amount to calculate a target current. Therefore, it is possible to prevent the steering from becoming heavier than needed even when the steering wheel is steered fast and to make it unnecessary to change the assist map.

DETAILED DESCRIPTION OF THE PREFERRED EMBODIMENTS

Preferred embodiments of the present invention will be hereinafter described with reference to the accompanying drawings.

First Embodiment

Figure 1:
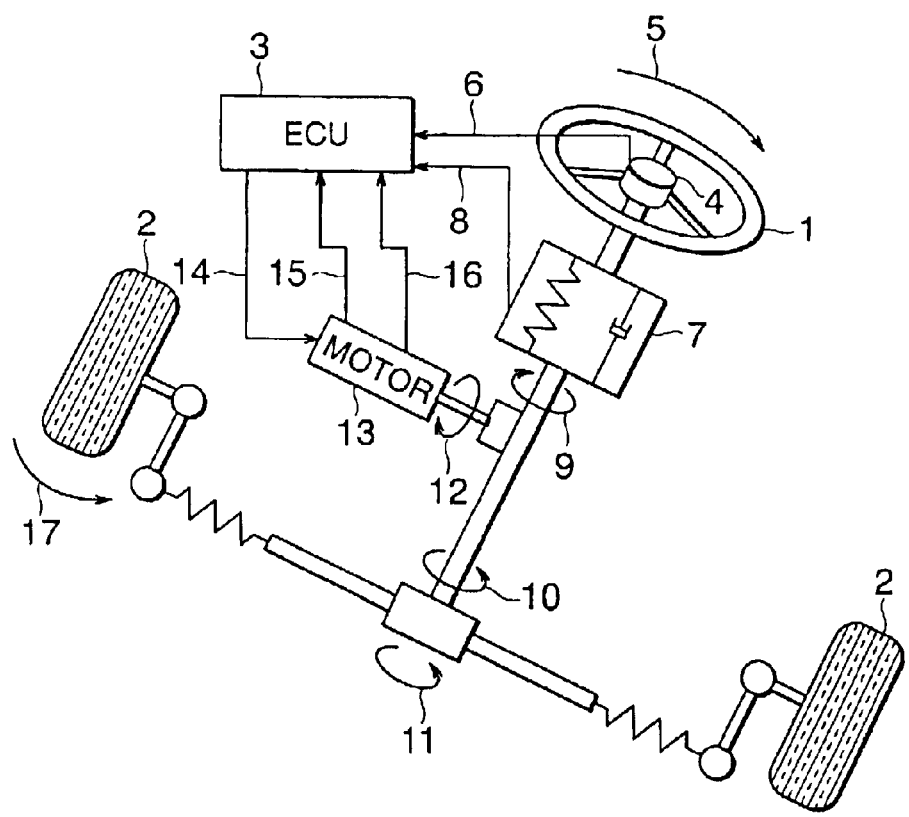
FIG. 1 is an explanatory view showing an example of a structure around an electric power steering to which the present invention is applied.

FIG. 1 is an explanatory view illustrating an electric power steering, which is subject to control of an electric power steering control device of this application, and peripheral equipment of the electric power steering. In the figure, reference numeral 1 denotes a steering wheel provided in a body of an automobile; 2 denotes tires engaged with each other via the steering wheel 1 and a shaft; 3 denotes a control unit (ECU); 4 denotes a steering angle sensor for detecting a steering angle; 5 denotes a steering angle detected by the steering angle sensor 4; 6 denotes a steering detection signal .sens outputted from the steering angle sensor 4; 7 denotes a torque sensor for detecting a torque; 8 denotes a steering torque detection signal Tsens outputted from the torque sensor 7; 9 denotes a steering torque Thdl detected by the torque sensor 7; 10 denotes a steering shaft reaction torque Ttran; 11 denotes a frictional torque Tfrp; 12 denotes an assist torque Tassist; 13 denotes a motor; 14 denotes a voltage Vsupply applied to the motor 13 by the control unit 3; 15 denotes an electric current detection signal Imtr-sens outputted from the motor 13; 16 denotes a voltage detection signal Vt-sens outputted from the motor 13; and 17 denotes a road surface reaction torque Talign.

As main functions, the electric power steering measures the steering torque 9 by the torque sensor 7 at the time when a driver turns the steering wheel 1 and generates the assist torque 12 according to the steering torque 9. In addition, in order to realize better steering feeling and operation stability, some electric power steering devices have a sensor for measuring the steering angle 5, a motor angle or a motor angular speed (which may be differentiated to find a motor angular acceleration). In addition when an electric current flowing to the motor 13 and a voltage applied between motor terminals are also taken in. Dynamically, a sum of the steering torque Thdl and the assist torque Tassist rotates the steering wheel 1 resisting the steering shaft reaction torque Ttran. Further, when the steering wheel 1 is rotated, an inertia term of the motor 13 also acts, and a relationship of the following expression is established after all.

$$Ttran = Thdl + Tassist - J \cdot d/dt \qquad (1)$$

A relationship of the following expression is established for the assist torque 12 of the motor 13.

$$Tassist = Ggear \cdot Kt \cdot Imtr \qquad (2)$$

In addition, the steering shaft reaction torque Ttran is a sum of the road surface reaction torque Talign and the frictional torque Tfric in the steering mechanism.

$$Ttran = Talign + Tfric \qquad (3)$$

In the control unit (ECU) 3 of the electric power steering, a target value of an electric current is calculated from the above-described sensor signal, and electric current control is performed such that an actual electric current of the motor 13 matches the target value. The motor 13 generates a predetermined torque found by multiplying an electric current value by a torque constant and a gear ratio (between the motor and the steering shaft) and assists a torque at the time when the driver steers.

Figure 2:
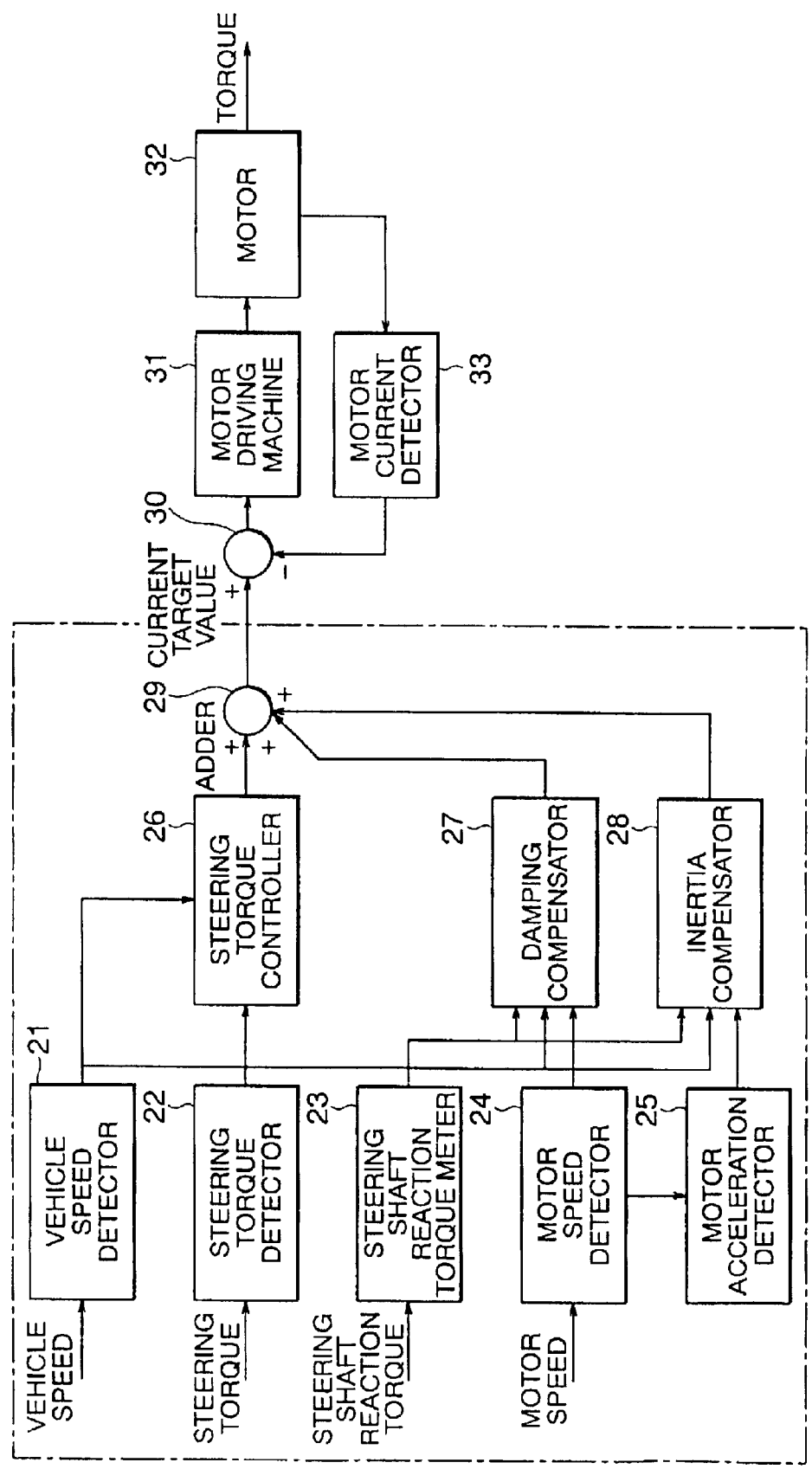
FIG. 2 is a block diagram showing a structure of an electric power steering control device in accordance with a first embodiment of the present invention.

FIG. 2 is a block diagram showing a structure of an electric power steering control device of this embodiment. A part surrounded by an alternate long and short dash line is a block for calculating a target value of an electric current applied to the motor 13. In FIG. 2, reference numeral 21 denotes a vehicle speed detector for detecting a vehicle speed; 22, a steering torque detector for detecting a steering torque; 23, a steering shaft reaction torque meter for measuring a steering shaft reaction; 24, a motor speed detector for detecting a motor speed; 25, a motor acceleration detector for finding a motor acceleration by calculation using a motor speed detected by the motor speed detector 24; 26, a steering torque controller for controlling a steering torque based on a vehicle speed detected by the vehicle speed detector 21 and a steering torque detected by the steering torque detector 22; 27, a damping compensator for finding a damping compensation current based on a vehicle speed detected by the vehicle speed detector 21, a steering shaft reaction torque detected by the steering shaft reaction torque meter 23 and a motor speed detected by the motor speed detector 24; 28, an inertia compensator for finding an inertia compensation current based on a vehicle speed detected by the vehicle speed detector 21, a steering shaft reaction torque detected by the steering shaft reaction torque meter 23 and a motor acceleration detected by the motor acceleration detector 25; 29, an adder for adding a base target current outputted from the steering torque controller 26, a damping compensation current and an inertia compensation current; 30, a subtractor for subtracting a motor current detected by a motor current detector 33 discussed later from an output of the adder 29; 31, a motor driving machine; 32, a motor driven by the motor driving machine 31; and 33, a motor current detector for detecting a motor current of the motor 32.

As shown in FIG. 2, the electric power steering control device of this embodiment consists of the steering torque controller 26, the damping compensator 27 and the inertia compensator 28. A vehicle speed detection signal outputted from the vehicle speed detector 21 is inputted in the respective controller/compensator 26 to 28, and a control parameter is changed based on the inputted vehicle speed detection signal. Here, since new elements are included only in the damping compensator 27 and the inertial compensator 28 in the present invention, only the damping compensator 27 and the inertia compensator 28 will be described. Note that, a gain of the damping compensator 27 maybe determined in accordance with a method described below. In embodiments described below, it is assumed that a method of determining a gain of the damping compensator 27 includes this method.

A damping compensation torque balances (a) an inertia torque, (b) a damping compensation torque and (c) a road surface reaction torque received from tires in a relationship of the following expression.

$$J\ddot{\theta} = -K_{damp}\dot{\theta} - K_{tire}\theta + u \Leftrightarrow \theta(s^2 + 2\xi\omega_n s + \omega_n^2) = u \quad (4)$$
<center>Laplace Transformation</center> wherein s is a Laplace operator and u is an input.

A damping coefficient $\xi$ of the above expression (1) is found as follows:

$$\xi = \frac{K_{damp}}{2}\sqrt{\frac{1}{K_{tire}J'}} \quad (5)$$

$$K_{damp} = 2\xi\sqrt{K_{tire}J'} \quad (6)$$

here $$\omega_n = \sqrt{\frac{K_{tire}}{J'}}, \quad J' = J_m - K_{iner}$$

Figure 21:
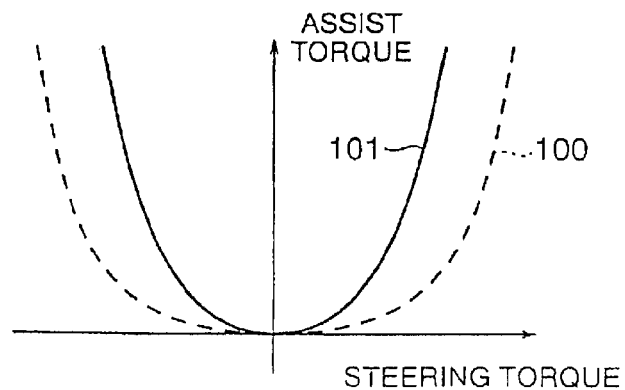
FIG. 21 is a graph for explaining a relationship between a steering torque and an assist torque.

A change of an assist map will be described. Conventionally, in order to assist an electric power steering, an assist map according to a steering torque is prepared as indicated by a broken line 100 of FIG. 21. It has been found, that when an amount of damping compensation is changed, it is necessary to chance the assist map as indicated by a solid line 101 of FIG. 21 to prevent a steering wheel torque larger than needed.

Figure 22A:
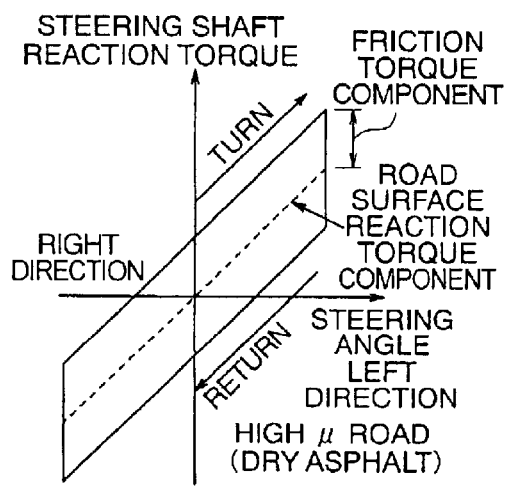
FIGS. 22a and 22b are graphs showing a conventional relationship between a steering shaft reaction and a gain.
Figure 22B:
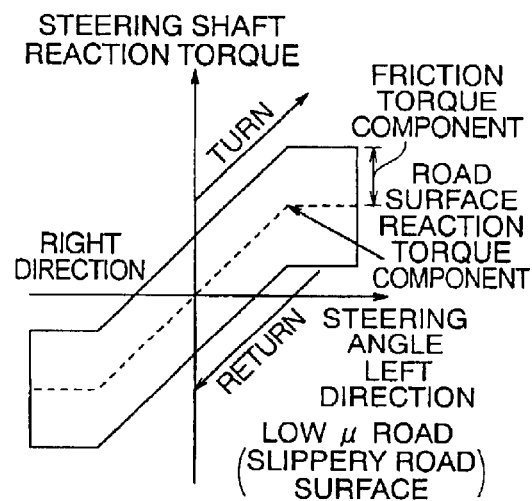

The relationship between a steering speed and a steering shaft reaction will be described next. Steering shaft reaction torque consists mainly of a sum of a road surface reaction torque generated by tires and frictional torque in a steering mechanism. The road surface reaction torque is smallest when a vehicle is traveling straight, and increases in proportion to an increase in a steering angle until a predetermined angle is reached and, at the same time gradually decreases as the steering angle increases when the predetermined ample is exceeded. Further at the time of normal traveling, the steering angle and the road surface reaction torque are in a proportional relationship on a dry asphalt road surface (high $\mu$ road) as shown in FIG. 22a. In addition, at the time of normal traveling the road surface reaction torque has a characteristic of gradually decreasing as the steering angle increases when the steering wheel exceeds the predetermined angle on a slippery road surface (low $\mu$ road) as shown in FIG. 22b. On the other hand, the frictional torque is constant in magnitude and has a characteristic in which its sign changes depending on a direction in which the steering wheel is turned. Therefore, the steering shaft reaction torque in turning the steering wheel increases when the steering wheel is turned significantly, and decreases when the steering wheel is returned, even if the steering ample is the same.

Figure 23:
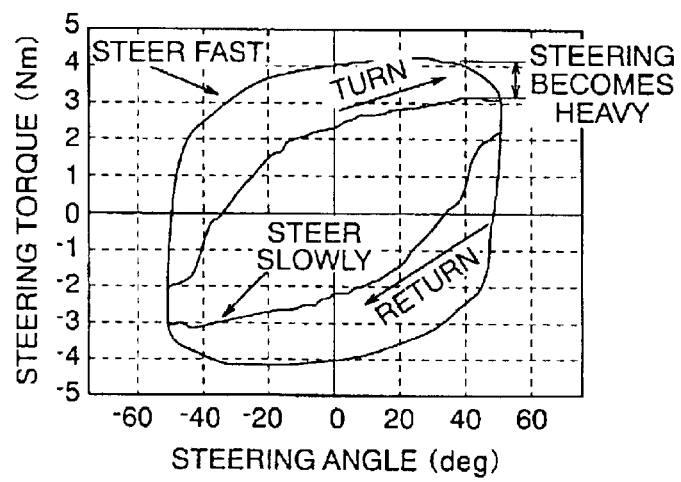
FIG. 23 is a graph for explaining a conventional relationship between a steering angle and a steering torque.

As shown in FIG. 23. in the conventional control, if damping control is intensified, the steering shaft reaction increases affected by the damping control and the steering wheel torque increases more than needed when the steering wheel is steered fast. In addition, if the steering wheel is steered slowly, the steering shaft reaction becomes an appropriate steering wheel torque because the damping control does not function much.

In general, an inertia compensation gain and a damping compensation gain are independently considered. If the damping coefficient $\xi$ is set small when a steering shaft reaction is large and the damping coefficient $\xi$ is set large when the steering shaft reaction is small, steering does not become heavy when a steering wheel is steered largely and the steering wheel is well fit in the vicinity of its neutral point. If $\xi$ is set as described above and Ktire is set according to Expression (6), it becomes possible to uniquely define Kdamp. Consequently, a map of Kdamp is no longer necessary. This embodiment becomes realizable by attaching a detector such as a load cell to a steering shaft column to measure a quantity of state of a steering shaft.

Figure 3:
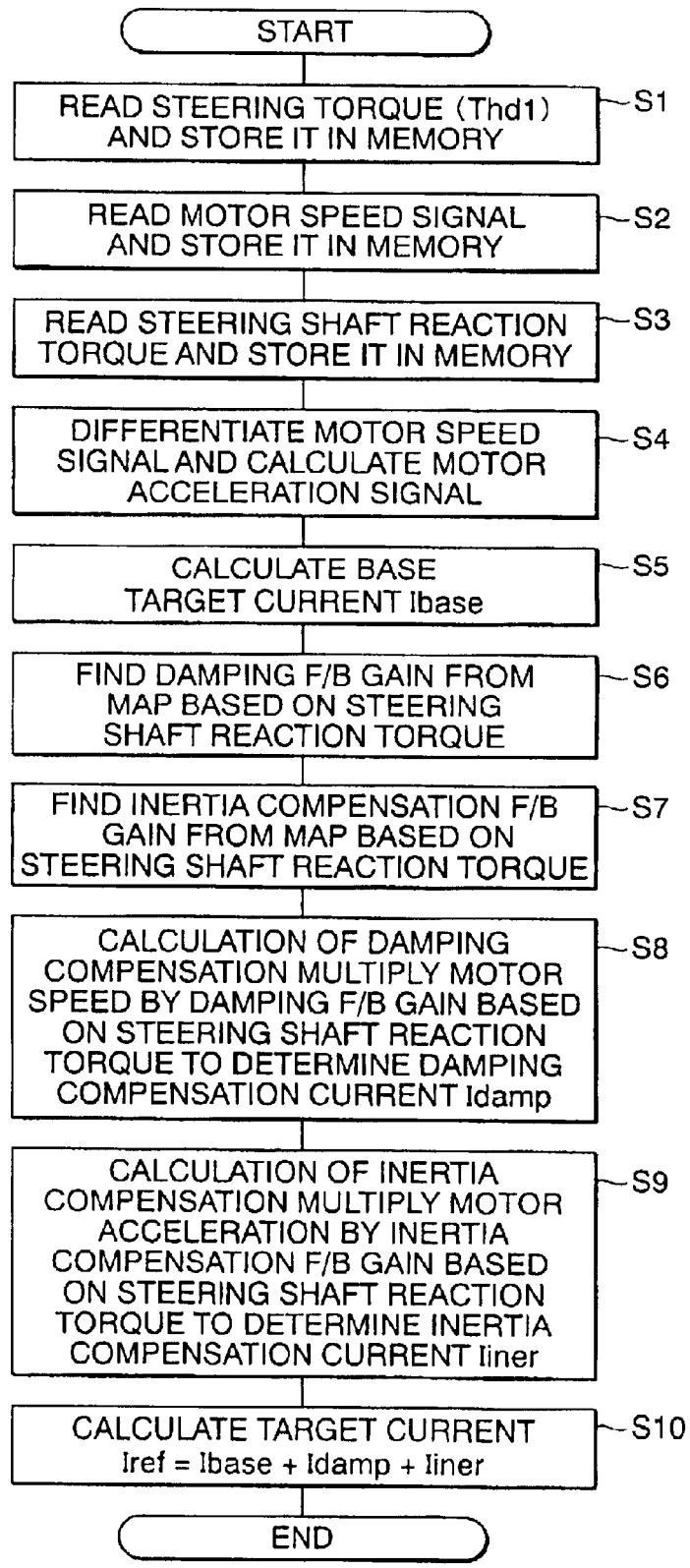
FIG. 3 is a flow chart showing operations of the electric power steering control device in accordance with the first embodiment of the present invention.
Figure 4:
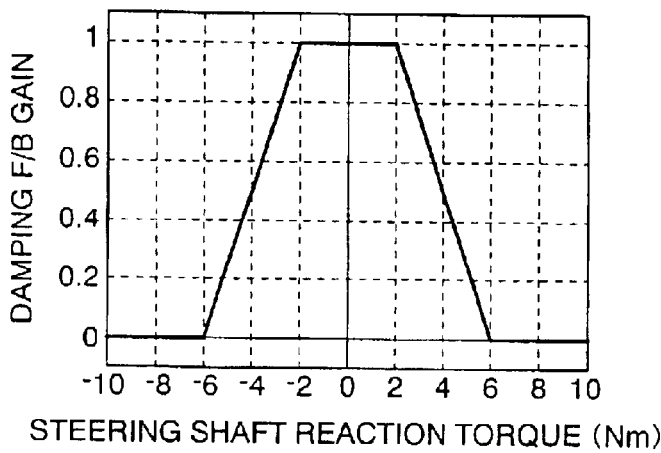
FIG. 4 is a graph for explaining a relationship between a steering shaft reaction and a damping gain in the electric power steering control device in accordance with the first embodiment of the present invention.

Next, operations of the electric power steering control device will be described with reference to the flow chart of FIG. 3. First, the steering torque Thdl is detected by the steering torque detector 22 and stored in a memory (step S1). Next, a motor speed is detected by the motor speed detector 24 and stored in the memory (step S2). Next, a steering shaft reaction torque is detected by the steering shaft reaction torque meter 23 and stored in the memory (step 53). Next, a motor acceleration is found by differentiating a motor speed signal outputted from the motor speed detector 24 (step S4). Next, a base target current Ibase is defined from a vehicle speed from the vehicle speed detector 21 and the above-described steering torque by the steering torque controller 26 (step S5). Next, a damping F/B gain is determined from the steering shaft reaction torque in accordance with such a map as shown in FIG. 4 by the damping compensator 27 (step S6). In addition, an inertia compensation F/B gain is determined from the steering shaft reaction torque in accordance with a map (not shown) in the same manner by the inertia compensator 28 (step S7). Next, the motor speed is multiplied by the damping F/B gain found in step S6 to find a damping compensation current Idamp by the damping compensator 27 (step S8). In addition, the motor acceleration is multiplied by the inertia compensation F/B gain found in step S7 to find an inertia compensation current Iiner by the inertia compensator 28 (step S9). Finally, the damping compensation current Idamp and the inertia compensation current Iiner are added to the base target current Ibase to calculate a target current Iref by the adder 29 (step S10). A current value found by subtracting an actual motor current from the target current obtained as described above is inputted in the motor driving machine 31, and the motor 32 is driven based on the current value. In this way, since gains of a damping compensator and an inertia compensator are determined according to a steering shaft reaction, it is no longer necessary to change an assist map when the gains are changed. In addition, steering does not become heavy by reducing damping when a steering wheel is turned, and stability of a vehicle is improved by increasing damping when returning the steering wheel.

Figure 5:
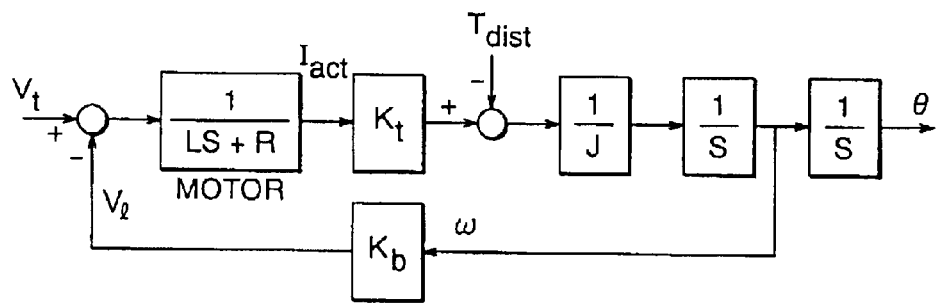
FIG. 5 is a block diagram showing how a motor speed signal is found from motor control in the electric power steering control device in accordance with the first embodiment of the present invention.

Note that, in the above description, the example in which a motor speed and a motor acceleration are detected and inputted in a damping compensator and an inertia compensator is described. A signal used in this case is an output of a motor current detector. However, the processing is completely the same if an output of a motor current is used to find a motor speed in accordance with the following Expression (7). In the following embodiments, the motor speed detector can perform both measurement and calculation. FIG. 5 shows an example of a structure for finding a motor speed signal from motor control.

$$RI_{act} + L\dot{I}_{act} = V_t - V_c$$

$$V_c = V_t - (RI_{act} + L\dot{I}_{act})$$

$$V_c = V_t - RI_{act} (\because L\dot{I}_{act} \approx 0 \text{ in a steering frequency}) \qquad (7)$$

$$\omega = \frac{V_e}{K_b}$$

Figure 6:
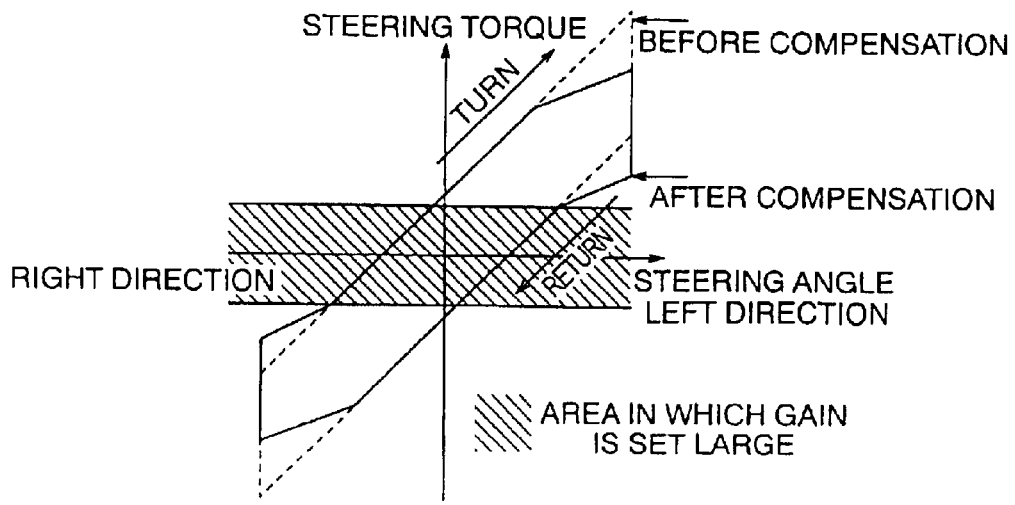
FIG. 6 is a graph for explaining a relationship between a steering shaft reaction and a gain in the electric power steering control device in accordance with the first embodiment of the present invention.

In the case of this embodiment, gains of a damping compensator and an inertia compensator are determined according to a steering shaft reaction, whereby it is no longer necessary to change an assist map when the gains of the damping compensator and the inertia compensator are changed, and improvement of control performance in a simpler form becomes possible. In addition, as shown in FIG. 6, since steering does not become heavy by reducing damping when a steering wheel is turned and stability of a vehicle is improved by increasing damping when the steering wheel is returned, unnecessary increase of a steering torque can be prevented and stability of a vehicle can be improved.

Second Embodiment

Figure 7:
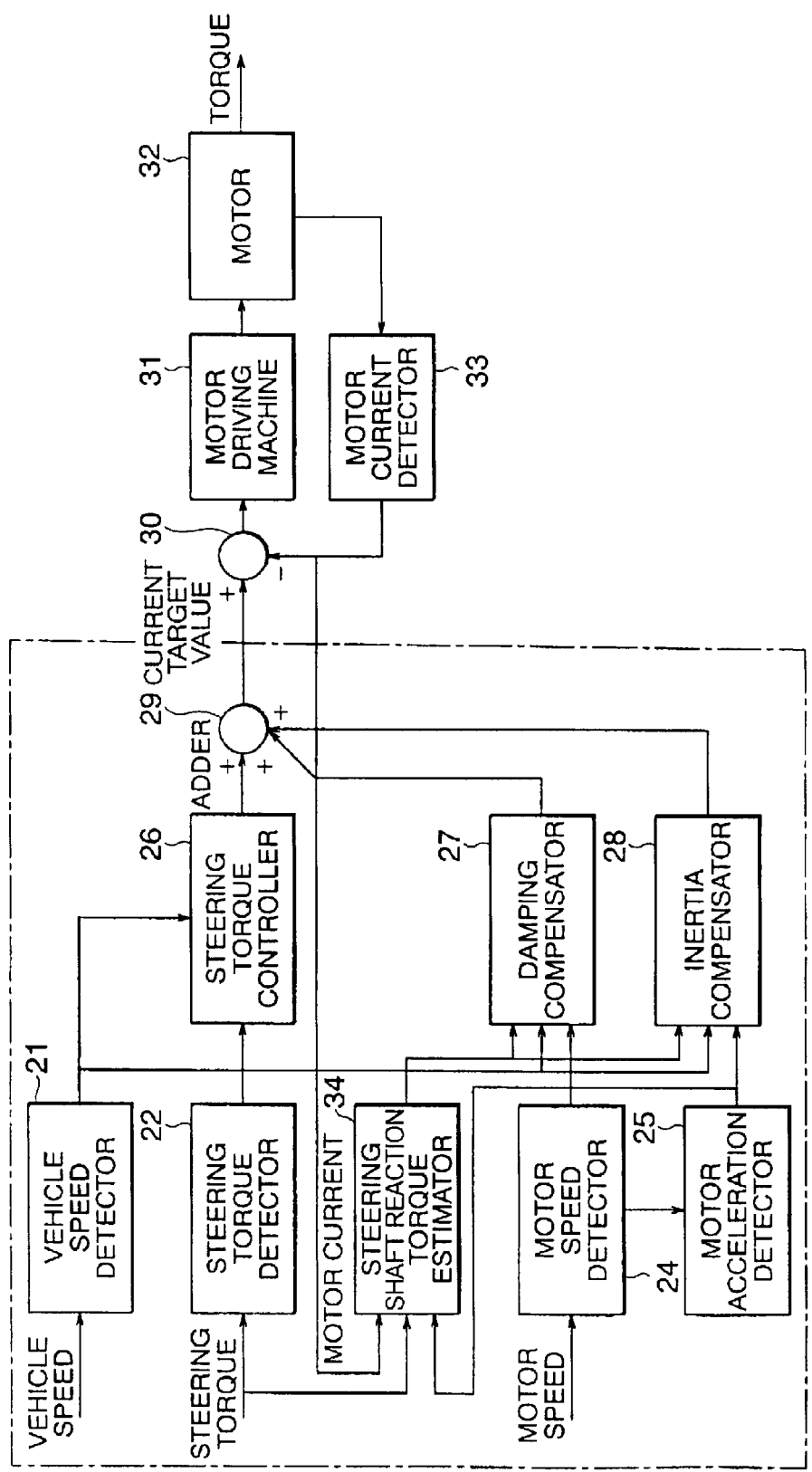
FIG. 7 is a block diagram showing a structure of an electric power steering control device in accordance with a second embodiment of the present invention.

FIG. 7 is a block diagram showing a structure of an electric power steering control device of this embodiment. In the figure, reference numeral 34 denotes a steering shaft reaction torque estimator for estimating a steering shaft reaction torque from a motor current detected by the motor current detector 3, a steering torque detected by the steering torque detector 22 and a motor acceleration obtained by the motor acceleration detector 25. Other parts of the structure are the same as those in the first embodiment.

As described in the first embodiment, for the damping compensator 27 and the inertia compensator 28, a motor speed and a motor acceleration are detected and multiplied by gains to determine amounts of compensation in this embodiment as well. In the first embodiment, the gains are changed according to an output of the steering torque shaft reaction torque meter 23 that detects a steering shaft reaction torque. However, in this embodiment, an output of a steering shaft reaction torque estimated in accordance with Expressions (1) to (3) is used. Other parts of the processing are completely the same as those in the first embodiment. In the following embodiments, a steering shaft reaction meter may be either a detector or an estimator.

Figure 8:
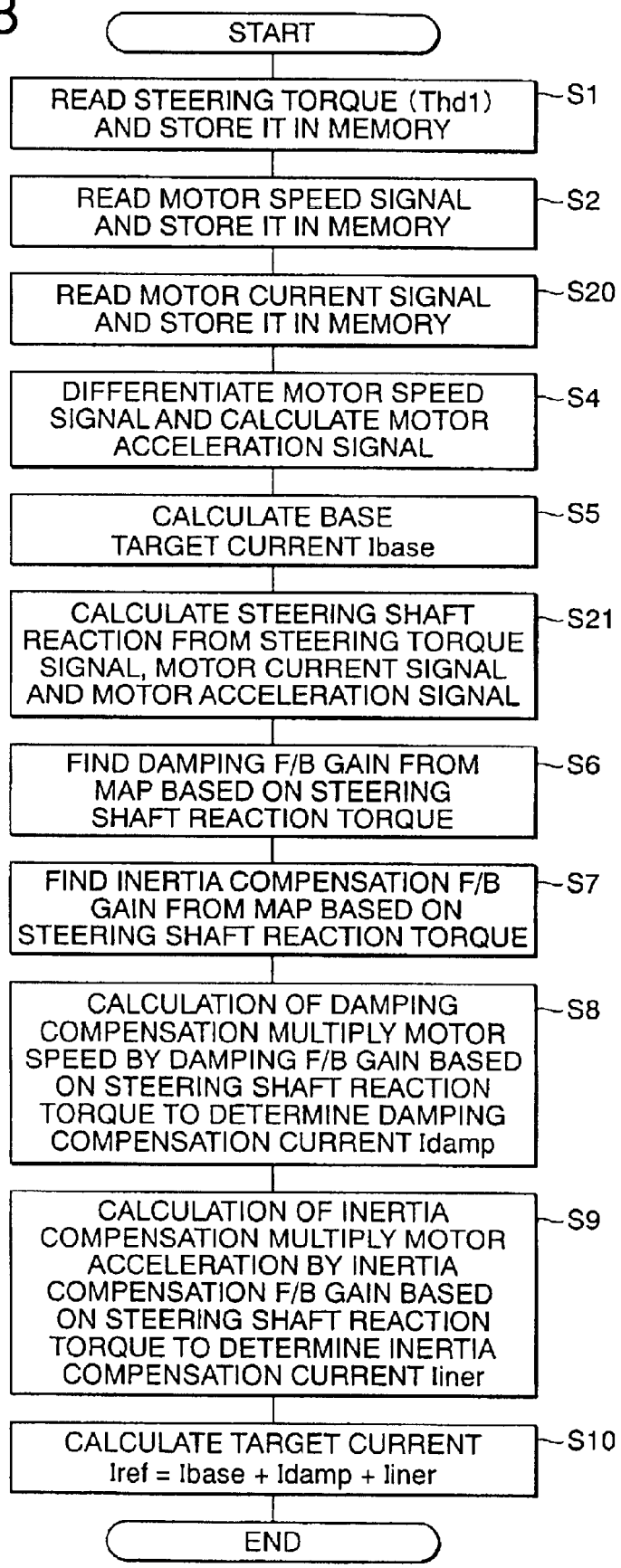
FIG. 8 is a flow chart showing operations of the electric power steering control device in accordance with the second embodiment of the present invention.

This operation will be described with reference to the flow chart of FIG. 8. Since steps S1 and S2 and steps S4 to S10 are the same as those in the first embodiment, descriptions of the steps will be omitted here. Therefore, here, operations of steps S20 and S21 that are provided instead of step S3 of FIG. 3 will be described. First, as shown in FIG. 8, in step S20, a motor current signal outputted from the motor current detector 33 is read by the steering shaft reaction torque estimator 34 and stored in a memory. Next, in step S21, a steering shaft reaction is calculated from a steering torque, a motor current and a motor acceleration.

As described above, in this embodiment, a steering shaft reaction is estimated even if the steering shaft reaction cannot be measured, whereby the same effect as the first embodiment is realized.

Third Embodiment

Figure 9:
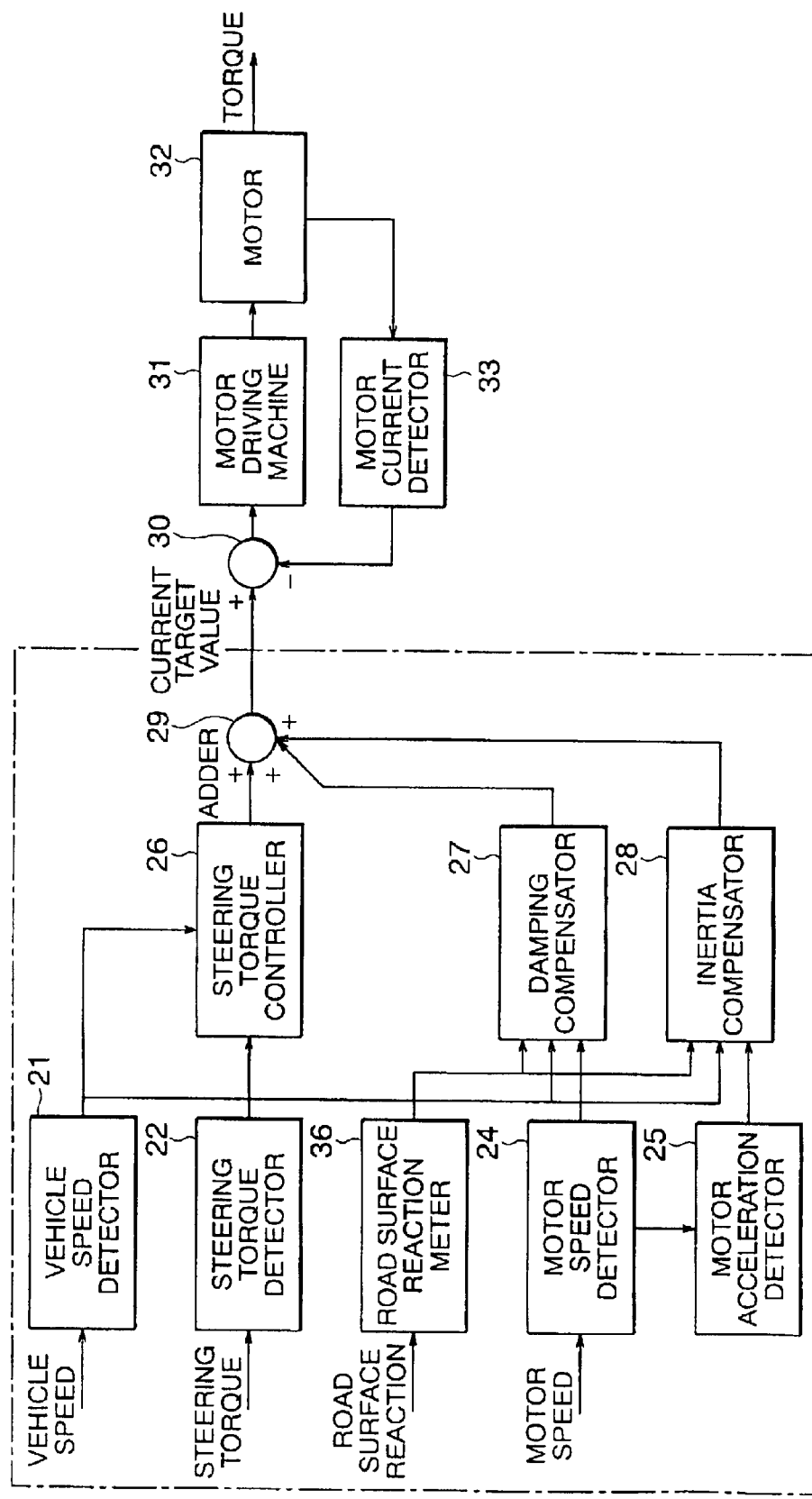
FIG. 9 is a block diagram showing a structure of an electric power steering control device in accordance with a third embodiment of the present invention.

FIG. 9 is a block diagram showing a structure of an electric power steering control device of this embodiment. In the figure, reference numeral 36 denotes a road surface reaction meter for measuring a road surface reaction torque. Other parts of the structure are the same as those in the first embodiment.

For the damping compensator 27 and the inertia compensator 28, a motor speed and a motor acceleration are detected and multiplied by gains to determine amounts of compensation. In the first embodiment, the gains are changed according to an output of the steering torque shaft reaction torque meter 23. However, in the third embodiment, the gains are changed based on an output of the road surface reaction meter 36. Other parts of the processing are completely the same as those in the first embodiment. Further, this embodiment becomes realizable by attaching a sensor for detecting a road surface reaction torque such as a six-axis force transducer to tires.

Figure 10:
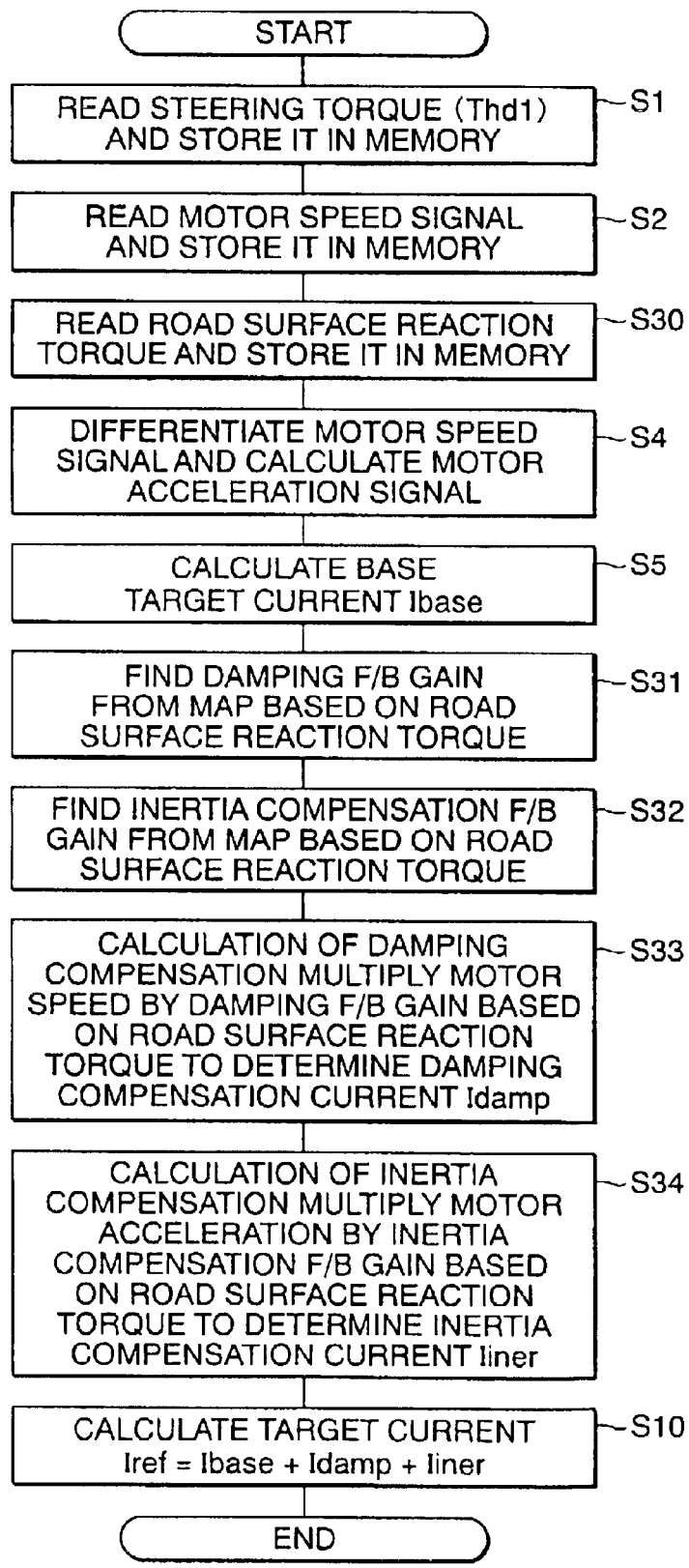
FIG. 10 is a flow chart showing operations of the electric power steering control device in accordance with the third embodiment of the present invention.

This operation will be described with reference to the flow chart of FIG. 10. Since steps S1 and S2, steps S4 and S5 and step S10 are the same as those in the first embodiment, description of the steps will be omitted here. Therefore, here, operations of steps S30 to S34 of FIG. 10 will be described. First, as shown in FIG. 10, in step S30, a road surface reaction torque is measured by the road surface reaction meter 36 and stored in a memory. Next, in step S31, a damping F/B gain is found from a map (not shown, see FIG. 4) based on the road surface reaction torque. In addition, in step S32, an inertia compensation F/B gain is found from the map (not shown, see FIG. 4) based on the road surface reaction torque in the same manner. Next, in step S33, the motor speed is multiplied by the damping F/B gain found in step S31 to find the damping compensation current Idamp by the damping compensator 27. In addition, in step S34, the motor acceleration is multiplied by the inertia compensation F/B gain found in step S32 to find the inertia compensation current Iiner by the inertia compensator 28.

As described above, in this embodiment, since a road surface reaction signal is used, a maximum value of a steering torque does not increase even if a damping gain is set large. Thus, an assist characteristic can be realized without changing an assist map. In addition, a steering torque is supplemented when a steering wheel is turned by swift steering of an operator, or the like. For example, since an unnecessary steering torque by damping compensation is not generated, an operation in such a case as suddenly avoiding an obstacle during driving can be performed so much easier for that.

Fourth Embodiment

Figure 11:
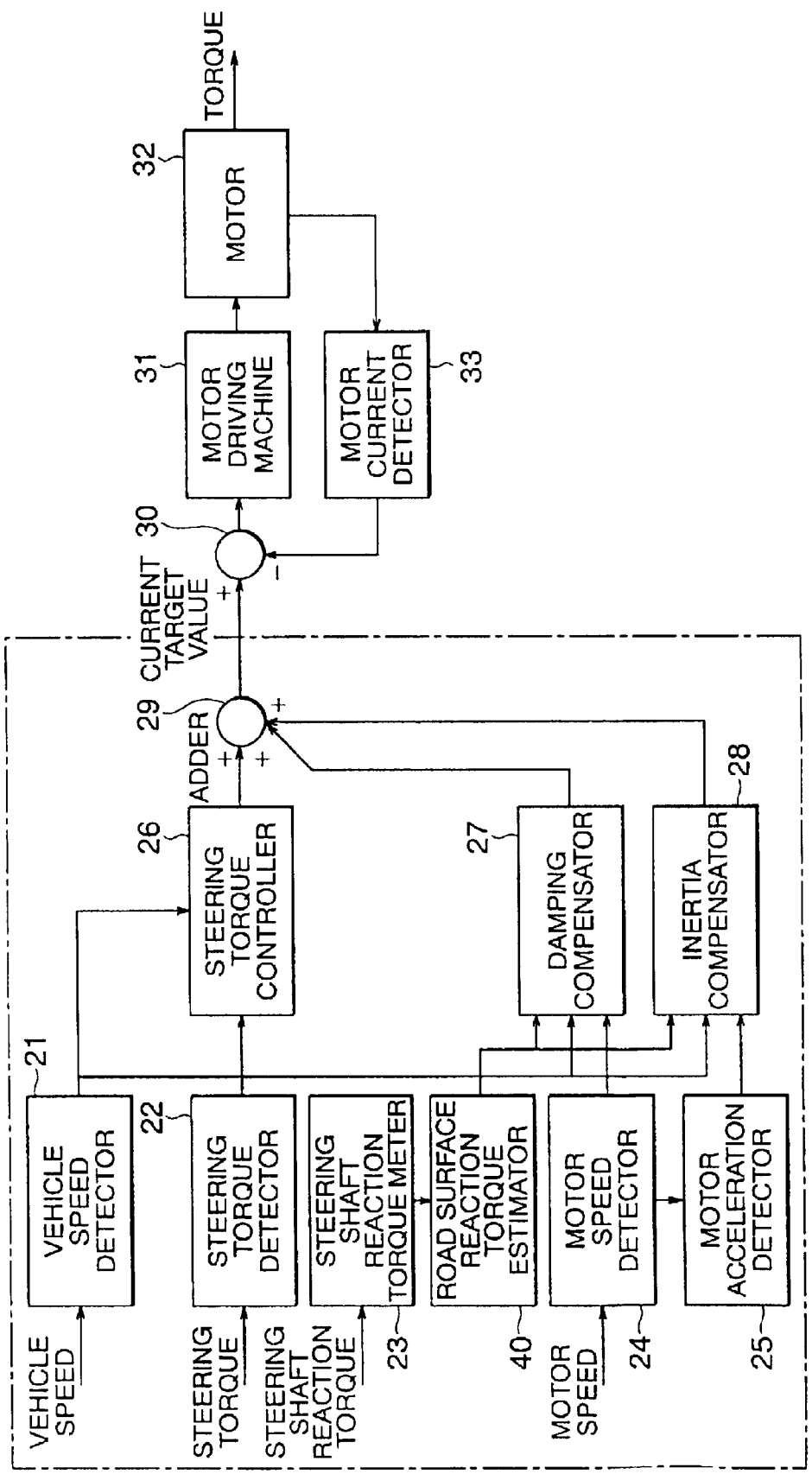
FIG. 11 is a block diagram showing a structure of an electric power steering control device in accordance with a fourth embodiment of the present invention.

FIG. 11 is a block diagram showing a structure of an electric power steering control device of this embodiment. In the figure, reference numeral 40 denotes a road surface reaction torque estimator for estimating a road surface reaction torque using a steering shaft reaction measured by the steering shaft reaction torque meter 23. Other parts of the structure are the same as those in the first embodiment.

Figure 12:
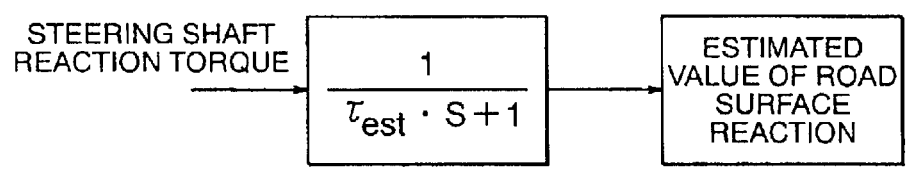
FIG. 12 is a block diagram showing a structure of a road surface reaction torque estimator in the electric power steering control device in accordance with the fourth embodiment of the present invention.

For the damping compensator 27 and the inertia compensator 28, a motor speed and a motor acceleration are detected and multiplied by gains to determine amounts of compensation. In the third embodiment, the gains are changed based on an output of a road surface reaction detector. However, in the fourth embodiment, a road surface reaction torque signal estimated from a steering shaft reaction is used in accordance with Expression (3). Other parts of the processing are completely the same as those in the third embodiment. FIG. 12 is a block diagram showing a structure for finding an estimated value of a road surface reaction from a steering shaft reaction torque. A friction term is removed by a filter shown in the figure.

Figure 13:
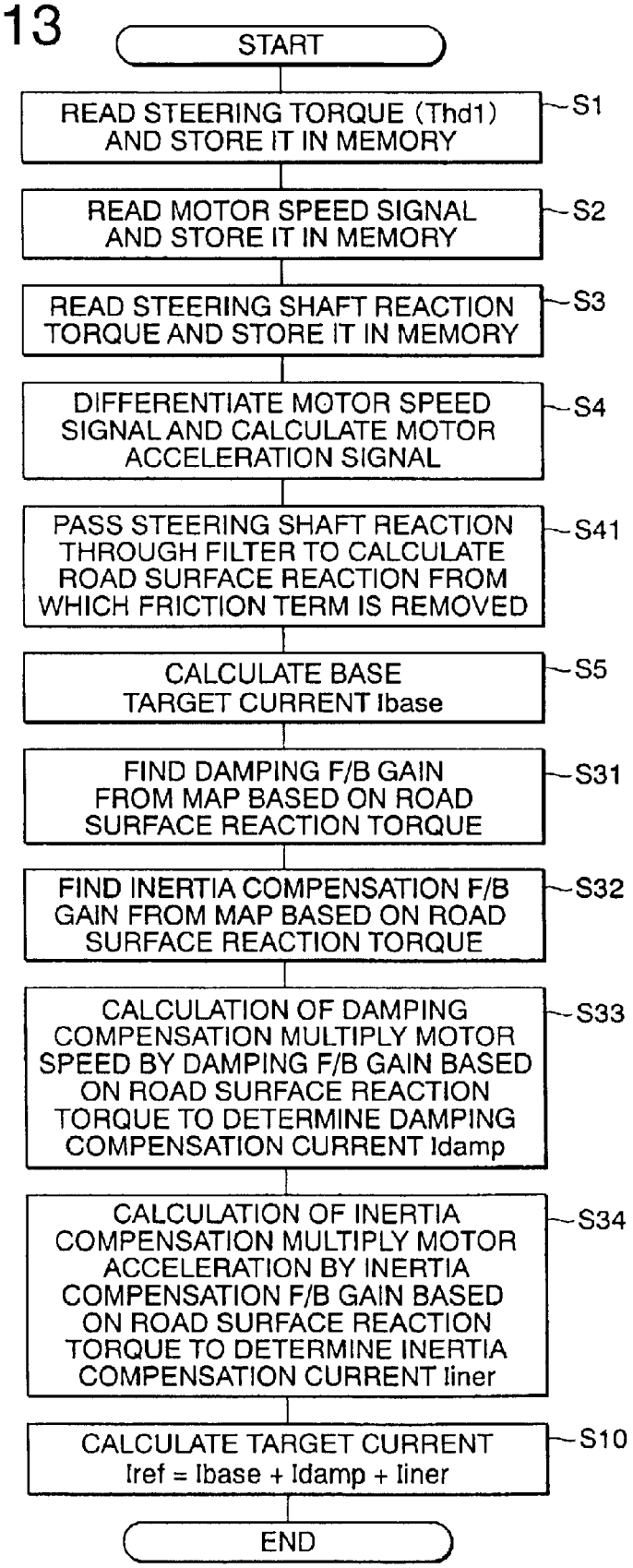
FIG. 13 is a flow chart showing operations of the electric power steering control device in accordance with the fourth embodiment of the present invention.

This operation will be described with reference to the flow chart of FIG. 13. Since steps S1 to S5 and step S10 are the same as those in the first embodiment and steps S31 to S34 are the same as those in the third embodiment, description of the steps will be omitted here. Therefore, here, only an operation of step S41 will be described. In step S41, by passing a steering shaft reaction through the filter shown in FIG. 12 to remove a friction term, a road surface reaction is calculated by the road surface torque estimator 40.

As described above, in this embodiment, since a road surface reaction is estimated from a steering shaft reaction torque, the same effect as the third embodiment can be realized by estimating a road surface reaction even if the road surface reaction cannot be detected.

Fifth Embodiment

Figure 14:
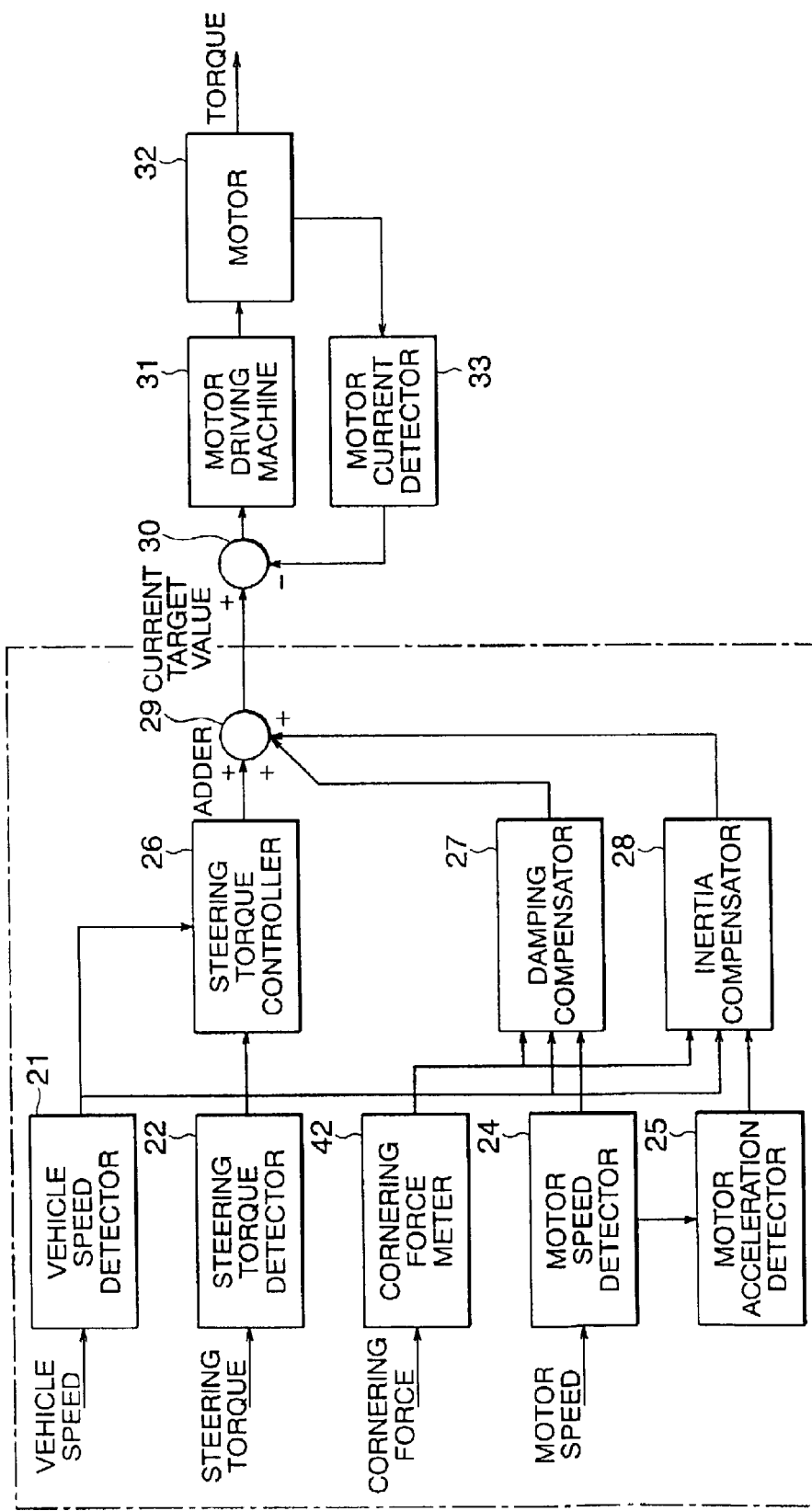
FIG. 14 is a block diagram showing a structure of an electric power steering control device in accordance with a fifth embodiment of the present invention.

FIG. 14 is a block diagram showing a structure of an electric power steering control device of this embodiment. In the figure, reference numeral 42 denotes a cornering force meter for measuring a cornering force of tires. Other parts of the structure are the same as those in the first embodiment.

For the damping compensator 27 and the inertia compensator 28, a motor speed and a motor acceleration are detected and multiplied by gains to determine amounts of compensation. In the first embodiment, the gains are changed according to an output of the steering shaft reaction torque meter 23. However, in the fifth embodiment, the gains are changed according to an output of the cornering force meter 42. Other parts of the processing are completely the same as those in the first embodiment. This embodiment becomes realizable by detecting a cornering force of tires by such a method as attaching a load cell in a link mechanism of a suspension transmitting a side force of the tires to a vehicle body.

Figure 15:
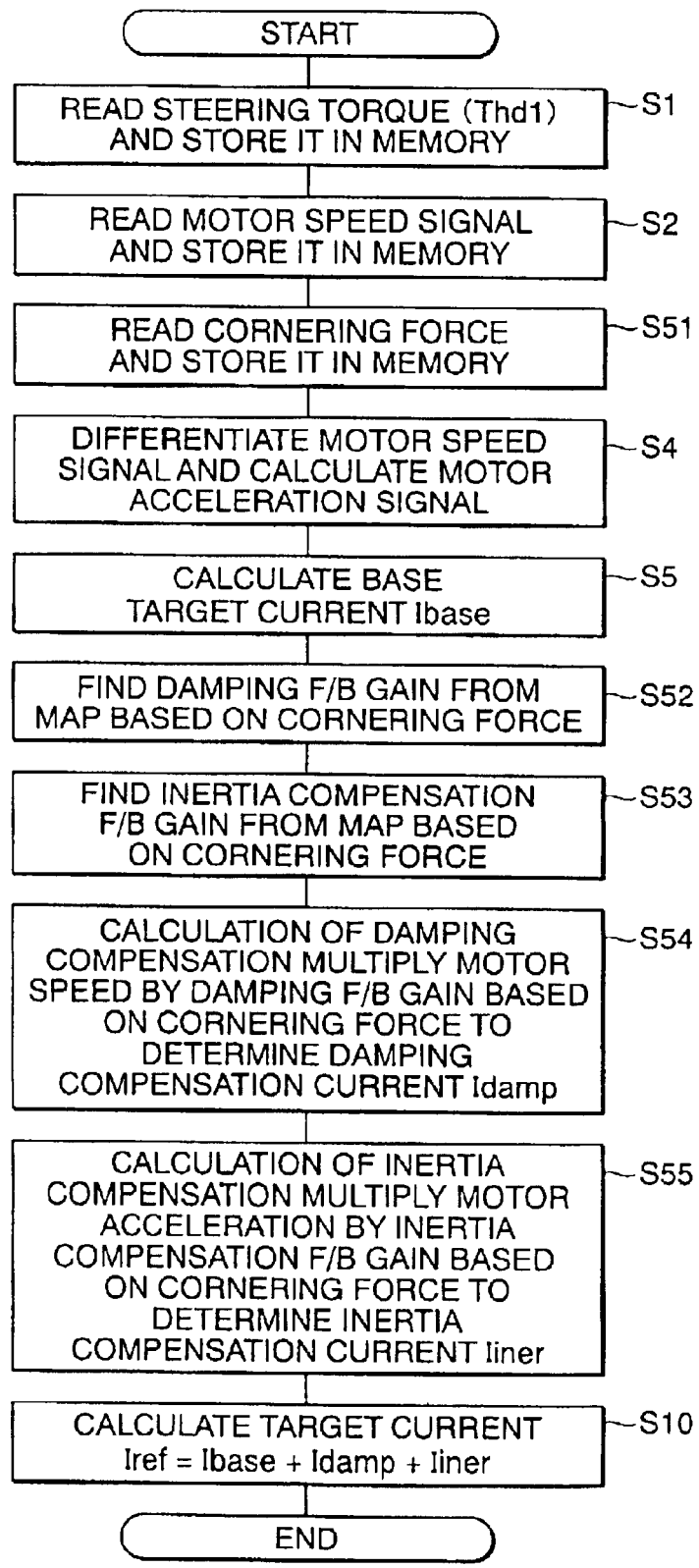
FIG. 15 is a flow chart showing operations of the electric power steering control device in accordance with the fifth embodiment of the present invention.

This operation will be described with reference to the flow chart of FIG. 15. Since steps S1 and S2, steps S4 and S5 and step S10 are the same as those in the first embodiment, description of the steps will be omitted here. Therefore, here, only operations of steps S51 to S55 will be described. First, in step S51, a cornering force is measured by the cornering force meter 42 and stored in a memory. Next, in step S52, a damping F/B gain is found from the map(not shown, see FIG. 4) based on the cornering force. In addition, in step S53, an inertia compensation F/B gain is found from the map (not shown, see FIG. 4) based on the cornering force in the same manner. Next, in step S54, the motor speed is multiplied by the damping F/B gain found in step S52 to find a damping compensation current Idamp by the damping compensator 27. In addition, in step S53, the motor acceleration is multiplied by the inertia compensation F/B gain found in step S55 to find an inertia compensation current Iiner by the inertia compensator 28.

Figure 16:
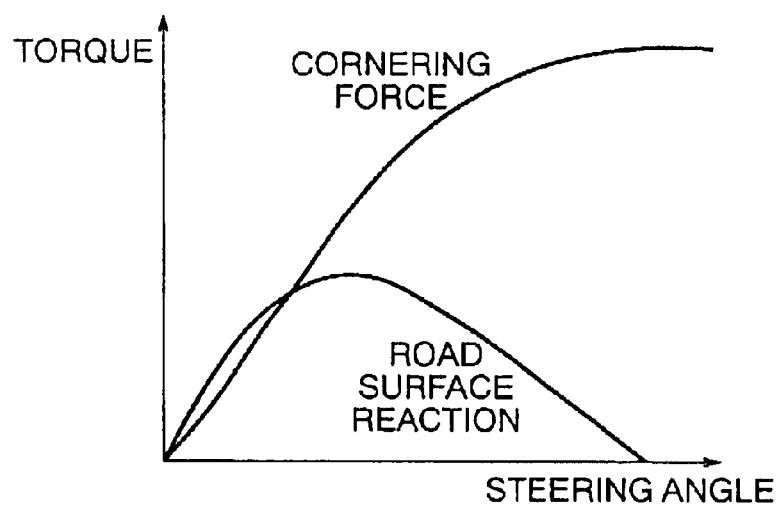
FIG. 16 is a graph for explaining a road surface reaction and a cornering force with respect to a steering angle and a torque in the electric power steering control device in accordance with the fifth embodiment of the present invention.

FIG. 16 is a graph showing a relationship of a road surface reaction and a cornering force with respect to a steering angle and a torque in the electric power steering control device. As shown in FIG. 16, for a gain for calculating a damping compensation torque, a cornering force is made a feedback gain, whereby control is effectively applied even in the case in which a steering angle is large and a road surface reaction falls.

As described above, in this embodiment, a cornering force is measured and its value is used. Thus, even if a steering shaft reaction detector is not provided, the same effect as the first embodiment can be realized by using a signal substituting for the detector. In addition, as in this embodiment, a state of a road surface p can be directly applied to control by determining a damping compensation amount and an inertia compensation amount according to a cornering force.

Sixth Embodiment

Figure 17:
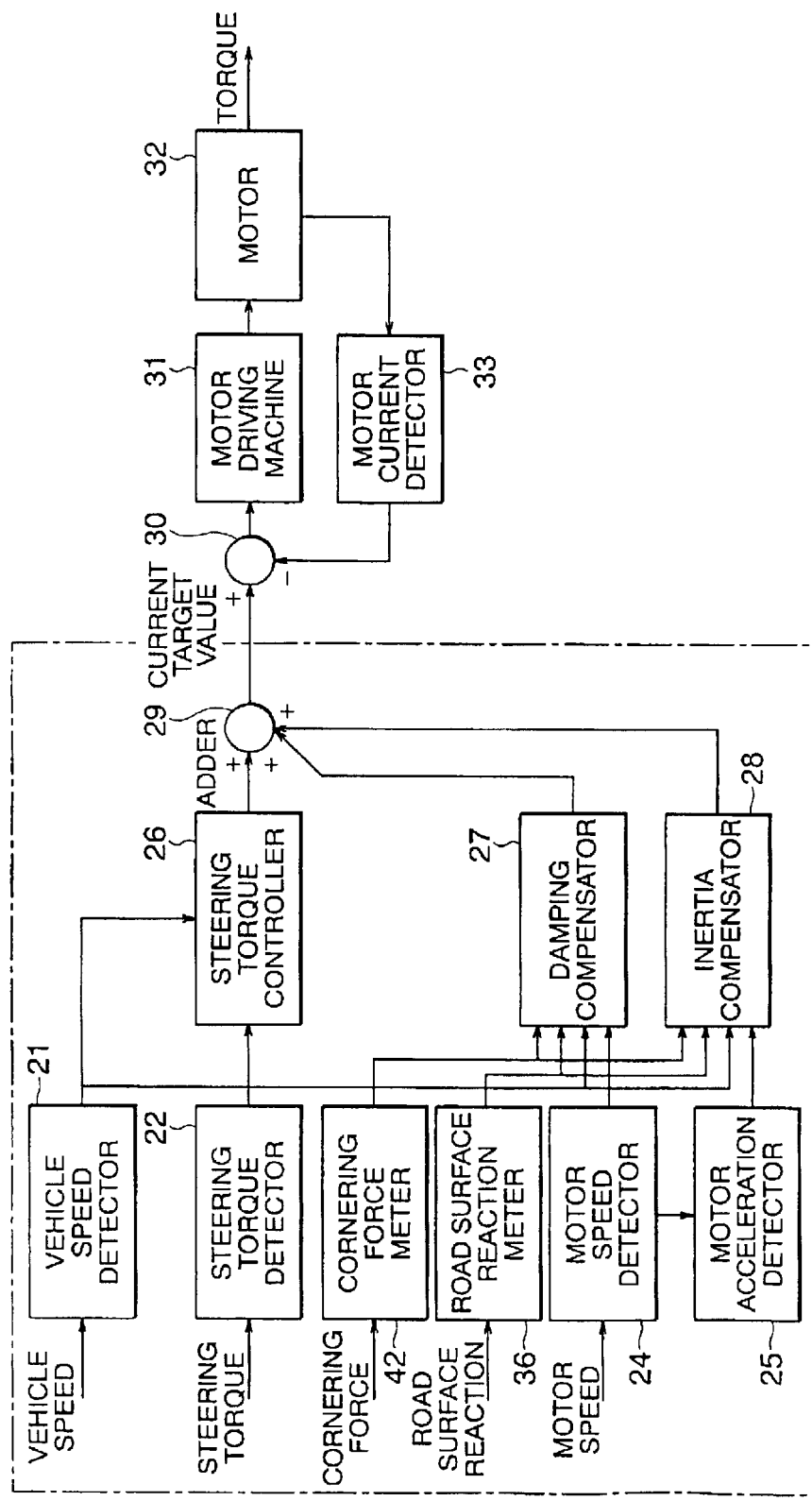
FIG. 17 is a block diagram showing a structure of an electric power steering control device in accordance with a sixth embodiment of the present invention.

FIG. 17 is a block diagram showing a structure of an electric power steering control device of this embodiment. In the figure, since all the elements are the same as those in the third or fifth embodiment, description on the elements will be omitted here. However, both the cornering force meter 42 and the road surface reaction meter 36 are provided in this embodiment.

For the damping compensator 27 and the inertia compensator 28, a motor speed and a motor acceleration are detected and multiplied by gains to determine amounts of compensation. In the third and fifth embodiments, the gains are changed according to an output of a road surface reaction meter and an output of a cornering force meter, respectively. However, in the sixth embodiment, the gains are changed based on one or both of the outputs of the road surface reaction meter and the cornering force meter depending on conditions. Other parts of the processing are completely the same as those in the third and fifth embodiment.

Figure 18:
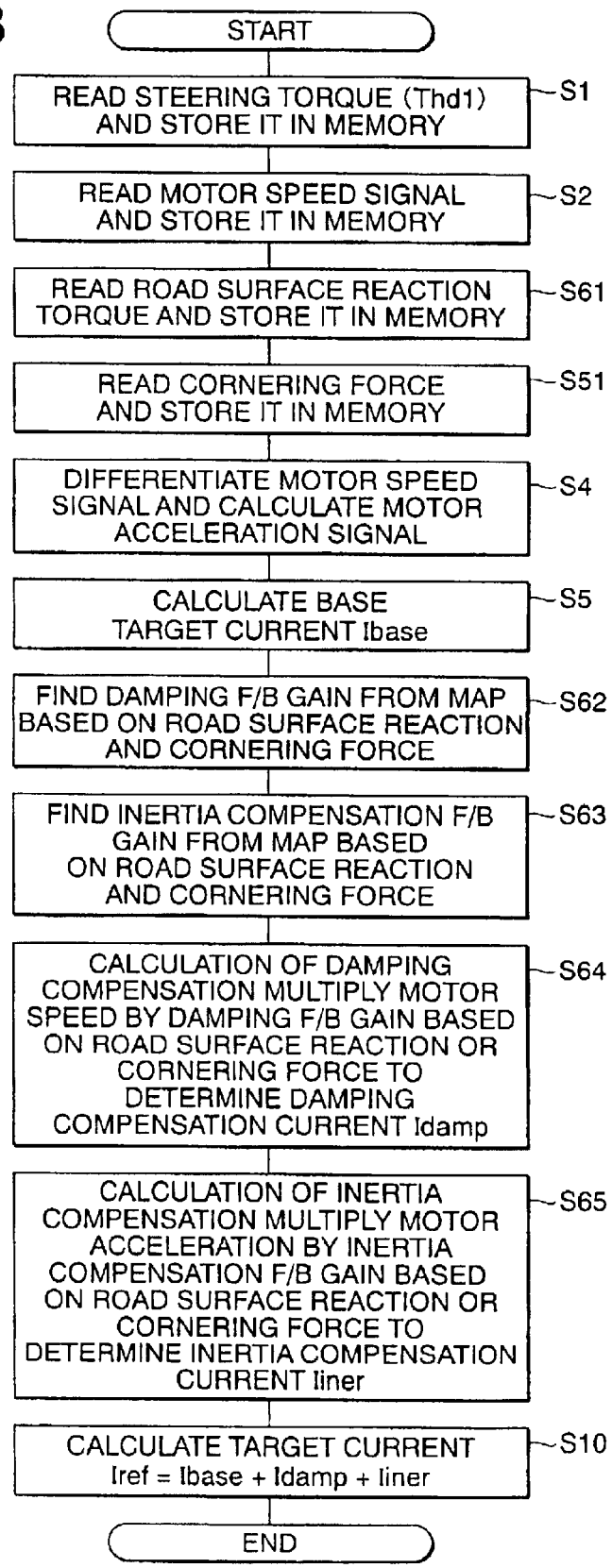
FIG. 18 is a flow chart showing operations of the electric power steering control device in accordance with the sixth embodiment of the present invention.

This operation will be described with reference to the flow chart of FIG. 18. Since steps S1 and S2, steps S4 and S5, step S10 and step S51 are the same as those in the third and fifth embodiment, description of the steps will be omitted here. Therefore, here, only operations of steps S61 to S65 will be described. First, as shown in FIG. 18, in step S61, a road surface reaction torque is measured by the road surface reaction meter 36 and stored in a memory. Next, in step S51, a cornering force is measured by the cornering force meter 42 and stored in the memory. Next, in step S62, a damping F/B gain is found from the map (not shown, see FIG. 4) based on the road surface reaction and/or the cornering force. In addition, in step S63, an inertia compensation F/B gain is found from the map (not shown, see FIG. 4) based on the road surface reaction and/or the cornering force in the same manner. Next, in step S64, the motor speed is multiplied by the damping F/B gain found in step S62 to find a damping compensation current Idamp by the damping compensator 27. In addition, in step S65, the motor acceleration is multiplied by the inertia compensation F/B gain found in step S63 to find an inertia compensation current Iiner by the inertia compensator 28.

Figure 19:
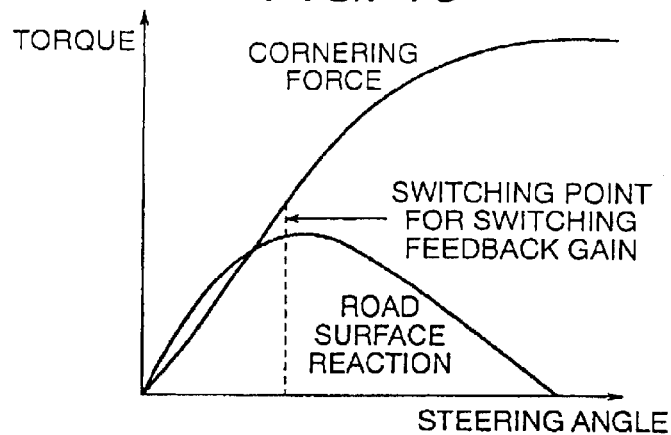
FIG. 19 is a graph for explaining a road surface reaction and a cornering force with respect to a steering angle and a torque in the electric power steering control device in accordance with the sixth embodiment of the present invention.
Figure 20:
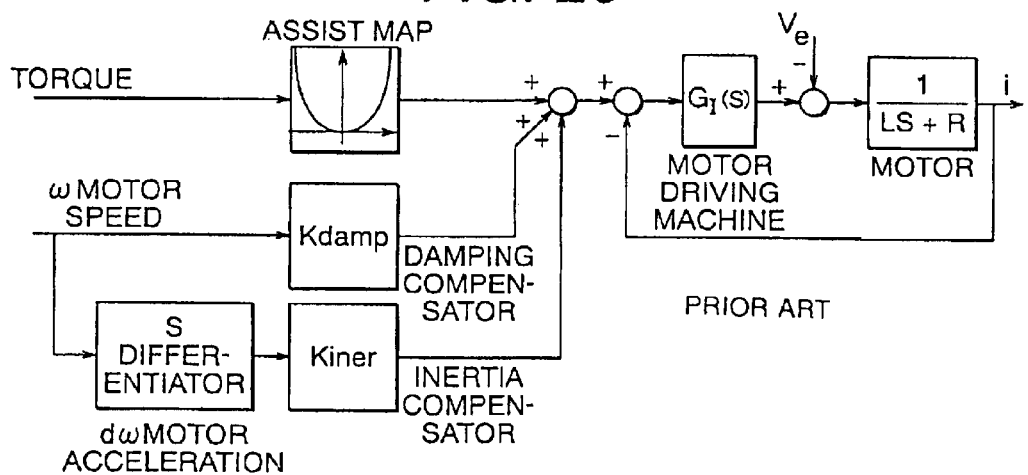
FIG. 20 is a block diagram showing an example of a structure of an electric power steering.

FIG. 19 is a graph for explaining a cornering force and a road surface reaction with respect to a steering angle and a torque in the electric power steering control device. In this embodiment, damping control on the basis of a road surface reaction is performed in the beginning and, at the point when the road surface reaction starts to fall, it is switched to damping control on the basis of a cornering force. As in this embodiment, the same effect as the first embodiment is realized by combining the third embodiment and the fifth embodiment. In addition, an amount of detection for determining an F/B gain to be an indicator of a damping compensation amount may be any combination among a steering shaft reaction, a road surface reaction and a cornering force as in this embodiment. In any combination, the same effect as the first embodiment can be expected.

As described above, in this embodiment, even if a steering shaft reaction detector is not provided, the same effect as the first embodiment can be realized by using a signal substituting for the detector. In addition, as shown in this embodiment, it is possible to combine both a road surface reaction and a cornering force as the substituting signal. For example, for a gain for calculating a damping compensation torque, a road surface reaction is made a feedback gain when a steering angle is small and a cornering force is made a feedback gain when the steering angle becomes larger than a point where the road surface reaction falls, whereby control is effectively applied even in the case in which a road surface reaction on a low $\mu$ road or the like falls with a small steering angle.

Further, the above first to sixth embodiments are described concerning the example in which both a damping compensator and an inertia compensator are provided. The present invention is not limited to this case, and any one of the damping compensator and the inertia compensator may be provided to compensate a base target current by either a damping compensation amount or an inertial compensation amount and perform control of an electric power steering.

The present invention relates to the electric power steering control device for controlling the electric power steering, comprising: the vehicle speed detecting means for detecting a vehicle speed; the steering torque detecting means for detecting a steering torque of the steering wheel; the steering shaft reaction torque outputting means for finding and outputting a steering shaft reaction torque; the motor speed detecting means for detecting a motor speed; the base target current calculating means for calculating a base target current for driving the motor based on the vehicle speed and the steering torque; the damping gain calculating means for finding a gain of a damping torque based on the steering shaft reaction torque; the damping compensation amount calculating means for calculating a damping compensation amount based on the gain of the damping torque and the motor speed; and the compensating means for compensating the base target current by the damping compensation amount to calculate a target current, whereby it is possible to prevent the steering from becoming heavier than needed even when the steering wheel is steered fast and to make it unnecessary to change the assist map.

Also, the present invention relates to the electric power steering control device for controlling the electric power steering, comprising: the vehicle speed detecting means for detecting a vehicle speed; the steering torque detecting means for detecting a steering torque of the steering wheel; the steering shaft reaction torque outputting means for finding and outputting a steering shaft reaction torque; the motor speed detecting means for detecting a motor speed; the motor acceleration detecting means which calculates and outputs a motor acceleration based on the motor speed detected by the motor speed detecting means; the base target current calculating means for calculating a base target current for driving the motor based on the vehicle speed and the steering torque; the inertia compensation gain calculating means for finding a gain of an inertia compensation torque based on the steering shaft reaction torque; the inertia compensation amount calculating means for calculating an inertia compensation amount based on the gain of the inertia compensation torque and the motor acceleration; and the compensating means for compensating the base target current by the inertia compensation amount to calculate a target current, whereby it is possible to prevent the steering from becoming heavier than needed even when the steering wheel is steered fast and to make it unnecessary to change the assist map.

Also, the present invention relates to the electric power steering control device for controlling the electric power steering, comprising: the vehicle speed detecting means for detecting a vehicle speed; the steering torque detecting means for detecting a steering torque of the steering wheel; the steering shaft reaction torque outputting means for finding and outputting a steering shaft reaction torque; the motor speed detecting means for detecting a motor speed; the motor acceleration detecting means which calculates and outputs a motor acceleration based on the motor speed detected by the motor speed detecting means; the base target current calculating means for calculating a base target current for driving the motor based on the vehicle speed and the steering torque; the damping gain calculating means for finding a gain of a damping torque based on the steering shaft reaction torque; the damping compensation amount calculating means for calculating a damping compensation amount based on the gain of the damping torque and the motor speed; the inertia compensation gain calculating means for finding a gain of an inertia compensation torque based on the steering shaft reaction torque; the inertia compensation amount calculating means for calculating an inertia compensation amount based on the gain of the inertia compensation torque and the motor acceleration; and the compensating means for compensating the base target current by the damping compensation amount and the inertia compensation amount to calculate a target current, whereby it is possible to prevent the steering from becoming heavier than needed even when the steering wheel is steered fast and to make it unnecessary to change the assist map.

Also, the present invention has a structure such that, in the electric power steering control device, the steering shaft reaction torque outputting means finds the steering shaft reaction torque by measurement, whereby it is possible to easily obtain an accurate value of the steering shaft reaction torque.

Also, the present invention has a structure such that the electric power steering control device further comprises the motor current measuring means for measuring a motor current of the motor, and the steering shaft reaction torque outputting means finds the steering shaft reaction torque by calculation based on the motor current, the steering torque and the motor acceleration, whereby even if the steering shaft reaction cannot be measured, it is possible to perform the same control as in the case where it can be measured by estimating the steering shaft torque.

Also, the present invention has a structure such that, in the electric power steering control device, the gain of the damping torque is increased when the steering shaft reaction torque is small and is decreased when the steering shaft reaction torque is large, whereby it is possible to set the damping compensation amount as an optimum value in accordance with the steering and road surface conditions, respectively.

Also, the present invention has a structure such that, in the electric power steering control device, the gain of the inertia compensation torque is increased when the steering shaft reaction torque is small and is decreased when the steering shaft reaction torque is large, whereby it is possible to set the inertia compensation amount as an optimum value in accordance with the steering and road surface conditions, respectively.

Also, the present invention has a structure such that, in the electric power steering control device, the gain of the damping torque is determined by a damping coefficient according to the steering shaft reaction torque, whereby it becomes unnecessary to change the assist map of the damping compensation amount.

Also, the present invention relates to the electric power steering control device, comprising: the vehicle speed detecting means for detecting a vehicle speed; the steering torque detecting means for detecting a steering torque of the steering wheel; the road surface reaction torque outputting means for finding and outputting a road surface reaction torque; the motor speed detecting means for detecting a motor speed; the base target current calculating means for calculating a base target current for driving the motor based on the vehicle speed and the steering torque; the damping gain calculating means for finding a gain of a damping torque based on the road surface reaction torque; the damping compensation amount calculating means for calculating a damping compensation amount based on the gain of the damping torque and the motor speed; and the compensating means for compensating the base target current by the damping compensation amount to calculate a target current, whereby it is possible to prevent the steering from becoming heavier than needed even when the steering wheel is steered fast and to make it unnecessary to change the assist map.

Also, the present invention relates to the electric power steering control device, comprising: the vehicle speed detecting means for detecting a vehicle speed; the steering torque detecting means for detecting a steering torque of the steering wheel; the road surface reaction torque outputting means for finding and outputting a road surface reaction torque; the motor speed detecting means for detecting a motor speed; the motor acceleration detecting means which calculates and outputs a motor acceleration based on the motor speed detected by the motor speed detecting means; the base target current calculating means for calculating a base target current for driving the motor based on the vehicle speed and the steering torque; the inertia compensation gain calculating means for finding a gain of an inertia compensation torque based on the road surface reaction torque; the inertia compensation amount calculating means for calculating an inertia compensation amount based on the gain of the inertia compensation torque and the motor acceleration; and the compensating means for compensating the base target current by the inertia compensation amount to calculate a target current, whereby it is possible to prevent the steering from becoming heavier than needed even when the steering wheel is steered fast and to make it unnecessary to change the assist map.

Also, the present invention relates to the electric power steering control device for controlling the electric power steering, comprising: the vehicle speed detecting means for detecting a vehicle speed; the steering torque detecting means for detecting a steering torque of the steering wheel; the road surface reaction torque outputting means for finding and outputting a road surface reaction torque; the motor speed detecting means for detecting a motor speed; the motor acceleration detecting means which calculates and outputs a motor acceleration based on the motor speed detected by the motor speed detecting means; the base target current calculating means for calculating a base target current for driving the motor based on the vehicle speed and the steering torque; the damping gain calculating means for finding a gain of a damping torque based on the road surface reaction torque; the damping compensation amount calculating means for calculating a damping compensation amount based on the gain of the damping torque and the motor speed; the inertia compensation gain calculating means for finding a gain of an inertia compensation torque based on the road surface reaction torque; the inertia compensation amount calculating means for calculating an inertia compensation amount based on the gain of the inertia compensation torque and the motor acceleration; and the compensating means for compensating the base target current by the damping compensation amount and the inertia compensation amount to calculate a target current, whereby it is possible to prevent the steering from becoming heavier than needed even when the steering wheel is steered fast and to make it unnecessary to change the assist map.

Also, the present invention has a structure such that in the electric power steering control device, the road surface reaction torque outputting means finds the road surface reaction torque by measurement, whereby it is possible to easily obtain an accurate value of the road surface reaction torque.

Also, the present invention has a structure such that the electric power steering control device further comprises the steering shaft reaction torque measuring means for measuring a steering shaft reaction torque, and the road surface reaction torque outputting means finds the road surface reaction torque by calculation based on the steering shaft reaction torque, whereby even if the road surface reaction cannot be measured, it is possible to perform the same control as in the case where it can be measured by estimating the road surface reaction.

Also, the present invention relates to the electric power steering control device for controlling the electric power steering, comprising: the vehicle speed detecting means for detecting a vehicle speed; the steering torque detecting means for detecting a steering torque of the steering wheel; the cornering force detecting means for detecting a cornering force of the tires; the motor speed detecting means for detecting a motor speed; the base target current calculating means for calculating a base target current for driving the motor based on the vehicle speed and the steering torque; the damping gain calculating means for finding a gain of a damping torque based on the cornering force reaction torque; the damping compensation amount calculating means for calculating a damping compensation amount based on the gain of the damping torque and the motor speed; and the compensating means for compensating the base target current by the damping compensation amount to calculate a target current, whereby it is possible to prevent the, steering from becoming heavier than needed even when the steering wheel is steered fast and to make it unnecessary to change the assist map.

The present invention relates to the electric power steering control device for controlling the electric power steering, comprising: the vehicle speed detecting means for detecting a vehicle speed; the steering torque detecting means for detecting a steering torque of the steering wheel; the cornering force detecting means for detecting a cornering force of the tires; the motor speed detecting means for detecting a motor speed; the motor acceleration detecting means which calculates and outputs a motor acceleration based on the motor speed detected by the motor speed detecting means; the base target current calculating means for calculating a base target current for driving the motor based on the vehicle speed and the steering torque; the inertia compensation gain calculating means for finding a gain of an inertia compensation torque based on the cornering force reaction torque; the inertia compensation amount calculating means for calculating an inertia compensation amount based on the gain of the inertia compensation torque and the motor acceleration; and the compensating means for compensating the base target current by the inertia compensation amount to calculate a target current, whereby it is possible to prevent the steering from becoming heavier than needed even when the steering wheel is steered fast and to make it unnecessary to change the assist map.

Also, the present invention relates to the electric power steering control device for controlling the electric power steering, comprising: the vehicle speed detecting means for detecting a vehicle speed; the steering torque detecting means for detecting a steering torque of the steering wheel; the cornering force detecting means for detecting a cornering force of the tires; the motor speed detecting means for detecting a motor speed; the motor acceleration detecting means which calculates and outputs a motor acceleration based on the motor speed detected by the motor speed detecting means; the base target current calculating means for calculating a base target current for driving the motor based on the vehicle speed and the steering torque; the damping gain calculating means for finding a gain of a damping torque based on the cornering force reaction torque; the damping compensation amount calculating means for calculating a damping compensation amount based on the gain of the damping torque and the motor speed; the inertia compensation gain calculating means for finding a gain of an inertia compensation torque based on the cornering force reaction torque; the inertia compensation amount calculating means for calculating an inertia compensation amount based on the gain of the inertia compensation torque and the motor acceleration; and the compensating means for compensating the base target current by the damping compensation amount and the inertia compensation amount to calculate a target current, whereby it is possible to prevent the steering from becoming heavier than needed even when the steering wheel is steered fast and to make it unnecessary to change the assist map.

Also, the present invention has a structure such that the electric power steering control device further comprises the road surface reaction outputting means for outputting a road surface reaction torque, and the gain of the damping torque is determined by at least one of the road surface reaction torque and the cornering force, whereby it is possible to perform an appropriate control in accordance with each of the road surface reaction, the steering angle, etc. by using the road surface reaction and the cornering force in combination.

Also, the present invention has a structure such that the electric power steering control device further comprises the road surface reaction outputting means for outputting a road surface reaction torque, and the gain of the inertia compensation torque is determined by at least one of the road surface reaction torque and the cornering force, whereby it is possible to perform an appropriate control in accordance with each of the road surface reaction, the steering angle, etc. by using the road surface reaction and the cornering force in combination.

Thus, it is seen that the electric power steering control device is provided. One skilled in the art will appreciate that the present invention can be practiced by other than the preferred embodiments which are presented for the purposes of illustration and not of limitation, and the present invention is limited only by the claims which follow.

What is claimed is:

1. An electric power steering control device for controlling an electric power steering system, comprising:
vehicle speed detecting means for detecting a vehicle speed of a vehicle including the electric power steering system;
steering torque detecting means for detecting a steering torque of a steering wheel of the vehicle;
steering shaft reaction torque outputting means for finding and outputting a steering shaft reaction torque of a steering shaft coupled to the steering wheel, wherein the steering shaft reaction torque is a sum of road surface reaction torque and frictional torque in a steering mechanism;
motor speed detecting means for detecting a motor speed of a motor of the electric power steering system;
base target current calculating means for calculating a base target current for driving the motor based on the vehicle speed and the steering torque;
damping gain calculating means for finding gain of a damping torque based on the steering shaft reaction torque;
damping compensation calculating means for calculating damping compensation based on the gain of the damping torque and the motor speed; and
compensating means for compensating the base target current by the damping compensation for calculating a target current.

2. An electric power steering control device for controlling an electric power steering system, comprising:
vehicle speed detecting means for detecting a vehicle speed of a vehicle including the electric power steering system;
steering torque detecting means for detecting a steering torque of a steering wheel of the vehicle;
steering shaft reaction torque outputting means for finding and outputting a steering shaft reaction torque of a steering shaft coupled to the steering wheel, wherein the steering shaft reaction torque is a sum of road surface reaction torque and frictional torque in a steering mechanism;
motor speed detecting means for detecting a motor speed of a motor of the electric power steering system; motor acceleration detecting means which calculates and outputs a motor acceleration of the motor based on the motor speed detected by the motor speed detecting means;
base target current calculating means for calculating a base target current for driving the motor based on the vehicle speed and the steering torque;
inertia compensation gain calculating means for finding gain of an inertia compensation torque based on the steering shaft reaction torque;
inertia compensation calculating means for calculating inertia compensation based on the gain of the inertia compensation torque and the motor acceleration; and
compensating means for compensating the base target current by the inertia compensation for calculating a target current.

3. An electric power steering control device for controlling an electric power steering system, comprising:
vehicle speed detecting means for detecting a vehicle speed of a vehicle including the electric power steering system;

steering torque detecting means for detecting a steering torque of a steering wheel of the vehicle;

steering shaft reaction torque outputting means for finding and outputting a steering shaft reaction torque of a steering shaft coupled to the steering wheel, wherein the steering shaft reaction torque is a sum of road surface reaction torque and frictional torque in a steering mechanism;

motor speed detecting means for detecting a motor speed of a motor of the electric power steering system;

motor acceleration detecting means which calculates and outputs a motor acceleration of the motor based on the motor speed detected by the motor speed detecting means;

base target current calculating means for calculating a base target current for driving the motor based on the vehicle speed and the steering torque;

damping gain calculating means for finding gain of a damping torque based on the steering shaft reaction torque;

damping compensation calculating means for calculating damping compensation based on the gain of the damping torque and the motor speed;

inertia compensation gain calculating means for finding gain of inertia compensation torque based on the steering shaft reaction torque;

inertia compensation calculating means for calculating inertia compensation based on the gain of the inertia compensation torque and the motor acceleration; and compensating means for compensating the base target current by the damping compensation and the inertia compensation for calculating a target current.

4. The electric power steering control device according to claim 1, wherein said steering shaft reaction torque outputting means finds the steering shaft reaction torque by measurement.

5. The electric power steering control device according to claim 1, further comprising motor current measuring means for measuring motor current of the motor, wherein the steering shaft reaction torque outputting means finds the steering shaft reaction torque by calculation based on the motor current, the steering torque, and the motor acceleration.

6. The electric power steering control device according to claim 1, wherein the gain of the damping torque increases when the steering shaft reaction torque decreases and decreases when the steering shaft reaction torque increases.

7. The electric power steering control device according to claim 2, wherein the gain of the inertia compensation torque increases when the steering shaft reaction torque is decreased and decreases when the steering shaft reaction torque increases.

8. The electric power steering control device according to claim 1, wherein the gain of the damping torque is determined by a damping coefficient according to the steering shaft reaction torque.

9. The electric power steering control device according to claim 2, wherein said steering shaft reaction torque outputting means finds the steering shaft reaction torque by measurement.

10. The electric power steering control device according to claim 2, further comprising motor current measuring means for measuring motor current of the motor,
wherein the steering shaft reaction torque outputting means finds the steering shaft reaction torque by calculation based on the motor current, the steering torque, and the motor acceleration.

11. The electric power steering control device according to claim 3, wherein said steering shaft reaction torque outputting means finds the steering shaft reaction torque by measurement.

12. The electric power steering control device according to claim 3, further comprising motor current measuring means for measuring motor current of the motor,
wherein the steering shaft reaction torque outputting means finds the steering shaft reaction torque by calculation based on the motor current, the steering torque, and the motor acceleration.

13. The electric power steering control device according to claim 3, wherein the gain of the damping torque increases when the steering shaft reaction torque decreases and decreases when the steering shaft reaction torque increases.

14. The electric power steering control device according to claim 3, wherein the gain of the inertia compensation torque increases when the steering shaft reaction torque is decreased and decreases when the steering shaft reaction torque increases.

15. The electric power steering control device according to claim 3, wherein the gain of the damping torque is determined by a damping coefficient according to the steering shaft reaction torque.

* * * * *